United States Patent [19]

Imanishi et al.

[11] Patent Number: 4,610,967

[45] Date of Patent: Sep. 9, 1986

[54] ZIRCONIA PORCELAIN AND METHOD OF MANUFACTURING THE SAME

[75] Inventors: Yuichiro Imanishi; Minoru Matsui, both of Nagoya, Japan

[73] Assignee: NGK Insulators, Ltd., Japan

[21] Appl. No.: 637,797

[22] Filed: Sep. 6, 1984

[30] Foreign Application Priority Data

Dec. 27, 1983 [JP] Japan .................................. 58-251882

[51] Int. Cl.$^4$ ........................ C04B 35/48; C04B 35/50
[52] U.S. Cl. .................................... 501/103; 501/134; 501/152
[58] Field of Search ........................ 501/103, 134, 152

[56] References Cited

U.S. PATENT DOCUMENTS

3,287,143  11/1966  Yavorsky ............................. 501/134
3,957,500   5/1976  Pitts ..................................... 501/103
4,328,296   5/1982  Tanaka et al. ....................... 501/103
4,360,598  11/1982  Otagiri et al. ....................... 501/103
4,370,393   1/1983  Watanabe et al. .................. 501/103

Primary Examiner—Mark L. Bell
Attorney, Agent, or Firm—Parkhurst & Oliff

[57] ABSTRACT

Disclosed herein is a zirconia porcelain which includes 1.5–5 mol % of yttrium oxide, 1–5.5 mol % of cerium oxide and the balance being substantially zirconium oxide. Disclosed herein also is a method of producing a zirconia porcelain, which includes the steps of preparing a mixed powder including 1.5–5 mol % of yttrium oxide, 1–5.5 mol % of cerium oxide and the balance being substantially zirconium oxide having an average particle size of less than 1.5 μm when measured according to an air permeation method, shaping the mixed powder into a molding, and firing the molding thus at a temperature of 1,100° C.–1,700° C.

18 Claims, 7 Drawing Figures

FIG.2

FIG_3

FIG_7

ZIRCONIA PORCELAIN AND METHOD OF MANUFACTURING THE SAME

BACKGROUND OF THE INVENTION (1) Field of the Invention

The present invention relates to a zirconia porcelain and a method of manufacturing the same. More particularly, the invention relates to a zirconia porcelain consisting essentially of zirconium oxide, yttrium oxide and cerium oxide and a manufacturing method for the zirconia porcelain thereof.

(2) Description of the Prior Art

Zirconia porcelains containing not higher than 5 mol % of only yttrium oxide as a stabilizer have been widely used as high temperature structural materials, cutting tool materials and the like because of its high heat resistance, high strength and high toughness. In the zirconia partially stabilized with yttrium oxide, tetragonal zirconia, which is stable at a high temperature, remains as a metastable phase at low temperatures by controlling the microstructure. Cracking development due to the phase transformation of the monoclinic phase, which is accompanied by a volume expansion, is prevented so as to attain a high strength body. The thus produced zirconia porcelain gradually undergoes transformation from the tetragonal phase to the monoclinic phase over time and because of the application of a thermal stresses, and so on. Thus, the deterioration phenomenon such as shape change and cracking development results in a reduction in the strength.

The metastable tetragonal phase is similar to super cooled state. It is considered that as a time during which the tetragonal phase is exposed to a temperature range of 200° C.–1,000° C. becomes longer, the nuclei of the monoclinic phase are ultimately transformed to the monoclinic phase which is thermodynamically stable. Even under control of the micro structure, when the phase transformation temperature is not less than 200° C., the potential force to cause the transformation is large and the system is still extremely unstable from the standpoint of the thermodynamics because the metastable tetragonal phase is in an extremely super cooled state. Accordingly, there have been strongly demanded zirconia porcelains having a high strength and an excellent thermal stability.

SUMMARY OF THE INVENTION

It is therefore an object of the present invention to provide a zirconia porcelain with a high strength which has an excellent thermal stability, free from deteriorating phenomena such as shape change, reduction in strength and the like even after long use, and has an excellent durability.

It is another object of the present invention to provide a method of manufacturing a zirconia porcelain having such properties.

According to the present invention, there is a provision of a zirconia porcelain characterized by containing both yttrium oxide and cerium oxide in the respective amounts of 1.5–5 mol % and 1–5.5 mol %.

According to another aspect of the invention, there is a provision of a method of producing such a zirconia porcelain which comprises steps of shaping a molding from a mixed powder of 1.5–5 mol % of yttrium oxide, 1–5.5 mol % of cerium oxide and the balance consisting essentially of zirconium oxide, which mixed powder has the average particle size of less than 1.5 μm as measured according to the air permeation method, and firing the molding thus shaped at a temperature of 1,000°–1,700° C.

These and other objects, features and advantages of the invention will be appreciated upon reading of the following description of the invention with understanding that some modifications, variations, and changed could be easily made by those skilled in the art to which the invention pertains without departing from the spirit of the invention and the scope of the claims appended hereto.

DETAILED DESCRIPTION OF THE INVENTION

Figure 1:
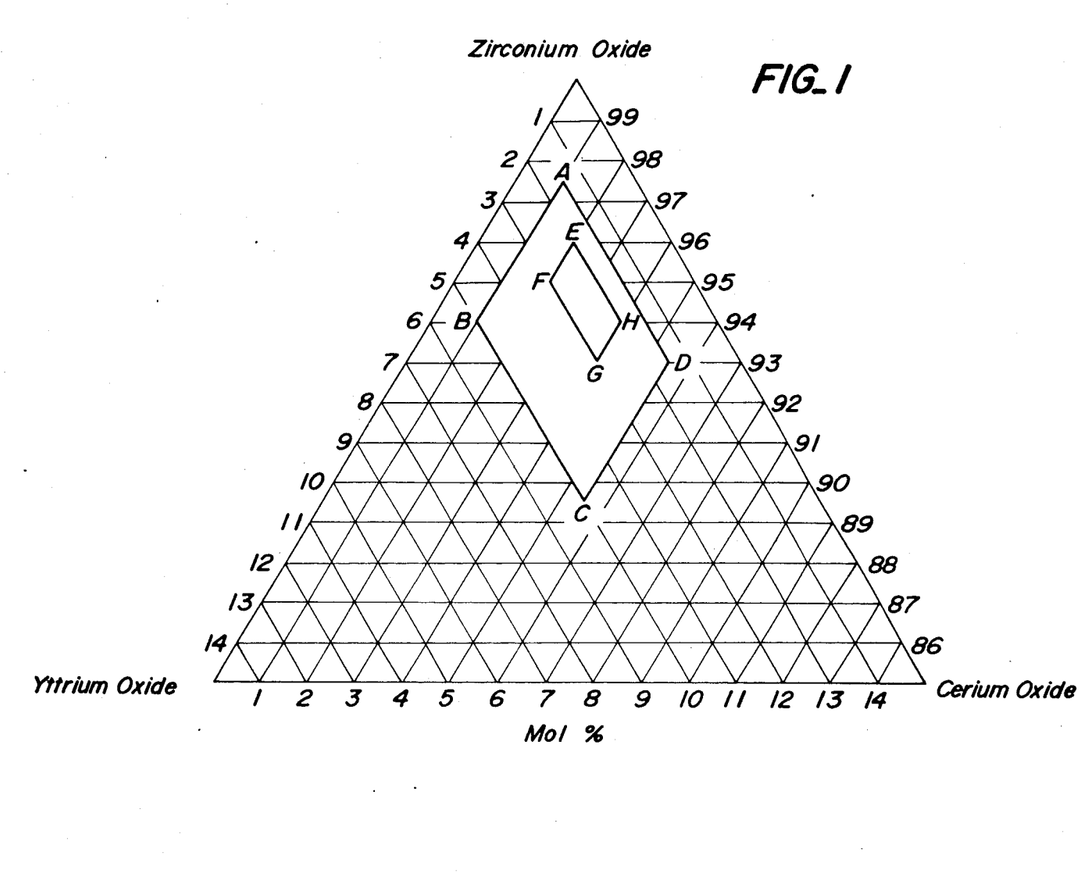
FIG. 1 is a diagram showing the composition of a zirconia porcelain.

The invention will be described more in detail with reference to the attached drawings as follows:

The zirconia porcelain according to the present invention is characterized by containing both yttrium oxide and cerium oxide in amounts of 1.5–5 mol % and 1–5.5 mol %, respectively. The content of yttrium oxide in the porcelain is preferably 1.5–5 mol %, more preferably 2–3 mol %, while that of the cerium oxide is 1–5.5 mol %, preferably 2–4 mol %. These ranges are shown in FIG. 1 at A-B-C-D and at E-F-G-H respectively. The average particle size of the zirconia crystals in the zirconia porcelain is preferably not larger than 10 μm, more preferably not larger than 2 μm.

As to the crystalline phases, the sum of the content of tetragonal zirconium oxide and the content of cubic zirconium oxide in the zirconia porcelain according to the invention is preferably not less than three times that of monoclinic zirconium oxide in terms of the volume fraction. The content of cubic zirconium oxide in the zirconia porcelain is less than the sum of the content of tetragonal zirconium oxide and the content of monoclinic zirconium oxide in terms of the volume fraction.

A method of manufacturing the zirconia porcelain according to the present invention is characterized by steps of shaping a molding from a mixed powder comprising 1.5–5 mol %, preferably 2–3 mol %, of yttrium oxide, 1–5.5 mol %, preferably 2–4 mol % of cerium oxide, and the balance being mainly zirconium oxide which mixed power has the average particle size of less than 15 μm as measured according to the air permeation method, and firing the molding at a temperature of 1,100° C.–1,700° C., more preferably 1,200° C.–1,500° C.

That is, the present invention relates to the zirconia porcelain and the method of manufacturing the same in which tetragonal zirconium oxide is stabilized through the addition of yttrium oxide and cerium oxide in the respectively specified amounts, whereby the shape changes, reduction in the strength and the like which are caused by the phase transformation from the tetragonal phase to the monoclinic phase under heating are suppressed to an extremely low level.

The present invention further relates to the zirconia porcelain and a manufacturing method therefor in which yttrium oxide and cerium oxide are contained in the respectively specified amounts, the average crystal particle size in the porcelain is suppressed to the specified value, or the content of cubic zirconium oxide is set at less than the specified value, whereby an extremely high strength is imparted upon the porcelain; and the average crystal particle size in the porcelain is set at the specified value, or the content of the monoclinic zirconium oxide is set less than the specified value, whereby the phase transformation from tetragonal zirconium oxide to monoclinic zirconium oxide can be more effectively restrained, so that the shape change and the reduction in the strength can be suppressed to a minimum amount over a long period of time.

According to the present invention, in order that the porcelain may be high in strength, excellent in thermal stability and low in shape change with lapse of time, it is extremely important that the porcelain contains as stabilizer 1.5–5 mol %, preferably 2–3 mol % of yttrium oxide and 1–5.5 mol %, preferably 2–4 mol % of cerium oxide. The reasons for these limitations will be explained below.

Figure 2:
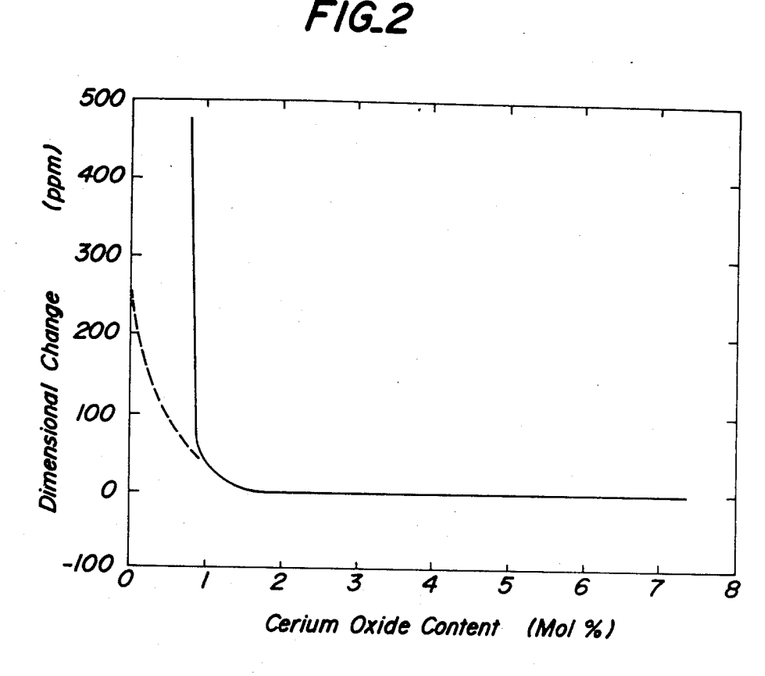
FIG. 2 is a diagram showing the relationship between the content of cerium oxide and the dimensional change rate before and after an electric furnace durability test.
Figure 3:
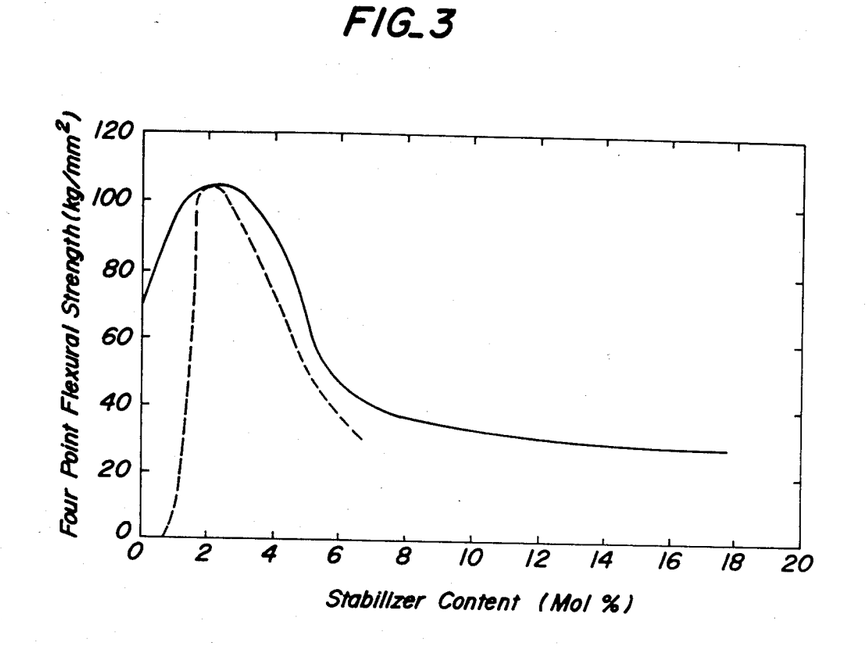
FIG. 3 is a diagram showing the relationship between the content of a stabilizer and a four point flexural strength.

FIG. 2 shows the relationship between the contents of yttrium oxide and cerium oxide and the changes in shape before and after the electric furnace durability test, in which a solid line is the relationship between the content of cerium oxide and the dimensional change when the content of yttrium oxide is 2 mol %, while a dotted line is that between the content of cerium oxide and the dimensional change when the content of yttrium oxide is 3 mol %. From this diagram, it is shown that when cerium oxide is contained in an amount of not less than 1 mol %, the dimensional change is lowered to a large extent. The measurement of the dimensional change before and after heat treatment in the electric furnace durability test is performed in the following manner. A zirconia porcelain is processed into 3 mm×4 mm×40 mm according to the specification of JIS R 1601 "Fine ceramics flexural strength test method" by using a diamond cutter and a diamond grindstone. Then, it is placed into an electric furnace and thermally treated in air at 250° C. for 5,000 hours. The change in length of the sample between before and after thermal treatment is determined by means of a micrometer. FIG. 3 shows the relationship between the content of yttrium oxide or cerium oxide and the flexural strength in which a solid line shows the relationship between the content of cerium oxide and the flexural strength when yttrium oxide is 2 mol %, and a dotted line shows the relationship between the content of yttrium oxide and the flexural strength when the content of cerium oxide is 2 mol %. It is shown in FIG. 3 that the flexural strength is largely lowered down to 50 kg/mm² or less in the range where the content of yttrium oxide is over 5 mol %; in the range where cerium oxide is over 5.5 mol %, and in the range where the content of yttrium oxide is less than 1.5 mol %.

Figure 4:
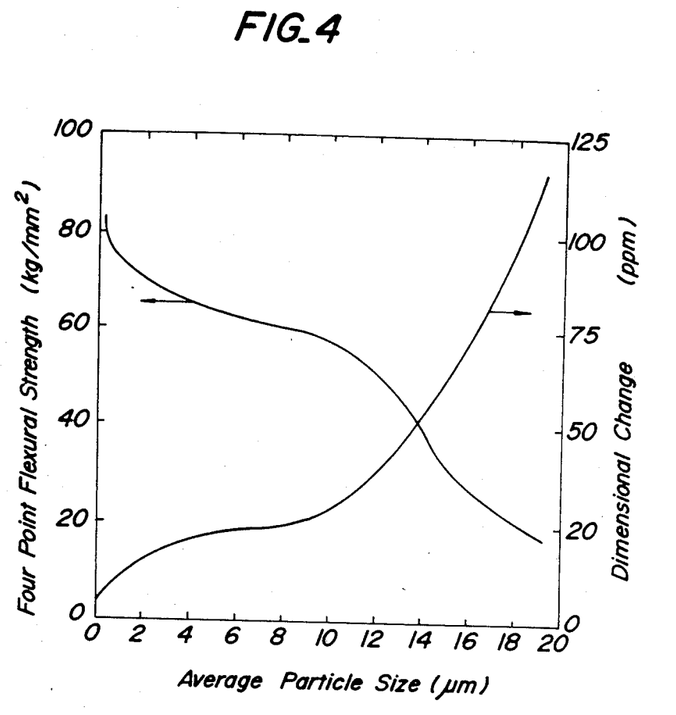
FIG. 4 is a diagram showing the relationship between the particle size of crystals in the zirconia porcelain and the four point flexural strength or dimensional changes before and after the electric furnace durability test.

As mentioned above, the reason why when the cerium oxide is used together with yttrium oxide as a stabilizer, is that the thermal stability, is drastically increased while high strength is maintained. The results are based on the assumption that when yttrium atoms are diffused, following the diffusion of cerium atoms into zirconium oxide, the location of yttrium and cerium in the lattice of zirconium oxide serves to relatively lower the free energy for the production of the tetragonal phase and in turn increase that for the production of the monoclinic phase. For this reason, it is considered that the stable range of the tetragonal phase, in reference to thermodynamics is spread to a lower temperature as compared with zirconia porcelain containing yttrium oxide alone as the stabilizer. As shown in FIG. 4, the influence upon the strength and the shape change before and after the electric furnace durability test of the average particle size of the zirconia crystals in the procelain, becomes conspicuous when the average particle size exceeds 10 μm. According to the zirconia porcelain of the invention, the thermal stability and a strength of not less than 50 kg/mm² can be maintained at the particle sizes up to 5 times as large as the critical particle size of 2 μm in the conventional zirconia procelain partially stabilized with yttrium oxide, but containing no cerium oxide. As shown in FIG. 4, when the average particle size is 2 μm or less in the zirconia porcelain of the invention, the high values are obtained for thermal stability and strength. When the average particle size is over 10 μm, the production rate of monoclinic zirconium oxide is increased and fine cracks are formed, so the strength is abruptly lowered and the dimensional change between larger. The reason why the phase transformation from the tetragonal phase to the monoclinic phase of the zirconium oxide crystals is difficult when the crystal particle size is small, is considered to be based on the fact that the interfacial energy between the tetragonal phase and the crystal interfacial phase is lower than that between the monoclinic phase and the crystal interfacial phase, and that the tetragonal phase is more stable in the fine particles in which the interfacial energy contributes more to the energy of the whole system. The average particle size of the crystals in the zirconia porcelain is measured in the following method.

A number, $\eta$, of particles present in a specified area S in which 50 or more of the particles are contained is counted in an electron micrograph of a sintered body a mirror-finished surface of which is etched with hydrofluoric acid. The average area per one particle, $S/\eta$, is defined as s, and the diameter d of a circle of an area equal to the s is calculated from the formula $d=(4s/\pi)^{\frac{1}{2}}$ or $\sqrt{4s/\pi}$. The values of d are determined with respect to three view positions of the same sample, and the average value thereof is multiplied by $\sqrt{3/2}$ (a correction coefficient for correcting some crystal particles being not cut at the largest diameter portion) to obtain the average particle size. The number $\eta$ of the particles is defined as a sum of a number of the particles completely included in the specified area S and a half of a number of the particles cut by the boundary of the area S.

Figure 5:
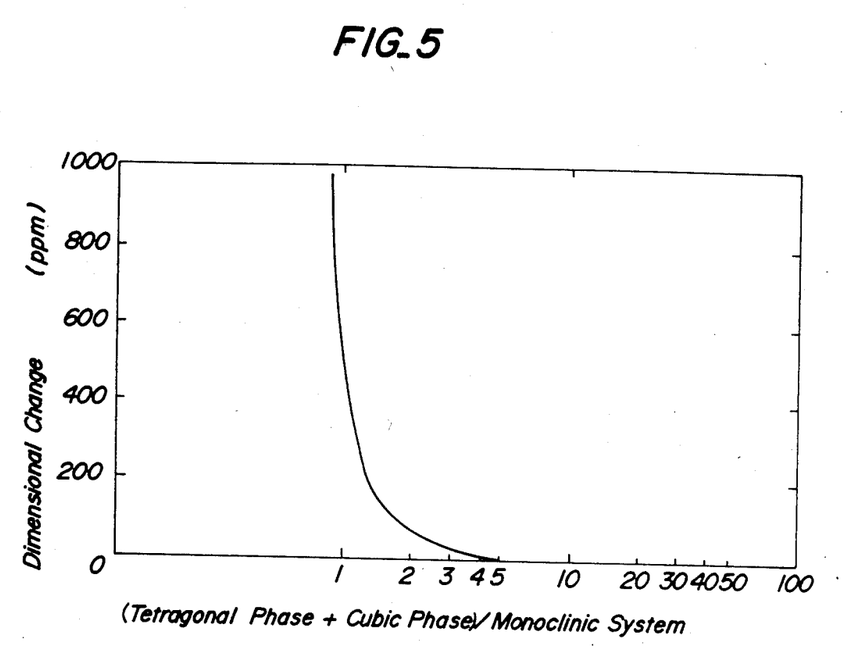
FIG. 5 is a diagram showing the relationship between the ratio of the sum of the content of tetragonal zirconium oxide and the content of cubic zirconium oxide to the content of monoclinic zirconium oxide in the zirconia porcelain and the dimensional change before and after the electric furnace durability test.

FIG. 5 shows the relationship between the ratio of the sum of the content of tetragonal zirconium oxide and the content of cubic zirconium oxide to the content of monoclinic zirconium oxide in the zirconia porcelain and the dimensional change in the electric furnace durability test. It is shown in FIG. 5 that when the summed content of tetragonal zirconium oxide and cubic zirconium oxide is in a range of less than 3 times the content of monoclinic zirconium oxide, the phase transformation from tetragonal zirconium oxide to monoclinic zirconium oxide vigourously occurs in the electric furnace durability test, so that dimensional change occurs due to the volume expansion of the whole porcelain, and when the strain is large, the cracking is induced resulting in decreased mechanical strength.

Figure 6:
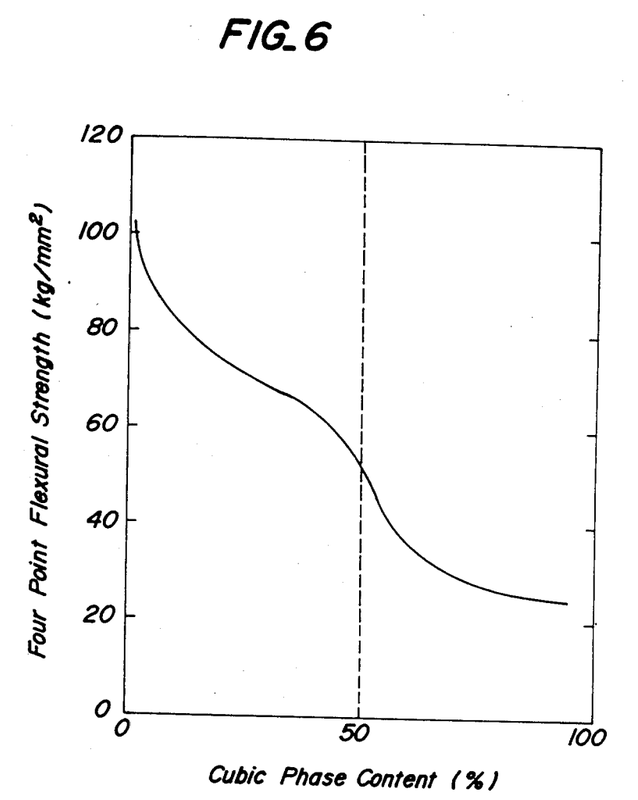
FIG. 6 is a diagram showing the relationship between the content of the cubic phase and the four point flexural strength.

When the content of cubic zirconium oxide is greater than the sum of the content of tetragonal zirconium oxide and the content of monoclinic zirconium oxide in the zirconia porcelain, that is, the content of cubic zirconium oxide is over 50% by volume, as shown in FIG. 6, the strength drops down to 50 kg/mm² or less. This is considered to be based upon the fact that the strength of cubic zirconium oxide particles is intrinsically low, and that cubic zirconium oxide is likely to be grain-grown as compared with tetragonal zirconium oxide and monoclinic zirconium oxide, and in most cases the particles of cubic zirconium oxide grow to larger sizes having a diameter of 5 times as large as that of the other zirconium oxide phases, so that it is likely to undergo a large stress concentration. The contents of the respective crystal phases were measured on the basis of the polygonal crystal quantitative analysis method by X-ray diffraction. The integrated intensity of the X-ray diffraction peaks is hereinafter referred to briefly as the integrated intensity. Since the tetragonal phase and the cubic phase of zirconium oxide are close to each other in terms of the lattice constant, their peaks are located near to each other at low angle diffraction, so that accurate separation can not be made. Accordingly, the ratio between the integrated intensity of the monoclinic phase peak and the sum of the integrated intensity of the tetragonal phase peak and the cubic phase peak [monoclinic phase/(tetragonal phase+cubic phase)] is measured, and the ratio of the tetragonal phase and the cubic phase is measured from the integrated intensities of the tetragonal phase peak and the cubic phase peak at a high angle at which the tetragonal phase peak and the cubic phase peak are separated from each other. A specific calculation method for the respective crystal phases of the zirconia on basis of the X-ray diffraction is as follows: Indexing of the diffraction peaks of tetragonal zirconium oxide was made according to the method of "JCPDS-Powder diffraction file" No. 17-923.

(1) Measurement of the integrated intensity:

Integrated intensity of a mixture of tetragonal phase $<111>$ and cubic phase $<111>$: $I_{T+C}<111>$ Integrated intensity of monoclinic phase $<11\bar{1}>$ and $<111>$: $I_M<11\bar{1}>$, $I_M<111>$ Integrated intensity of tetragonal phase $<004>$ and $<400>$: $I_T<004>$, $I_T<400>$ Integrated intensity of cubic phase $<400>$: $I_C<004>$ (2) The contents of the respective crystal phases were obtained in terms of "1% by weight" according to the following formulae:

Monoclinic zirconium oxide (% by volume)

$$M = \frac{I_M<111> + I_M<111>}{I_M<111> + I_M<111> + I_{T+C}<111>} \times 100$$

Tetragonal zirconium oxide (% by weight)

$$T = (100 - M) \times \frac{I_T<004> + I_T<400>}{I_T<004> + I_T<400> + I_C<400>}$$

Cubic zirconium oxide (% by volume) $C=100-M-T$

In this case, when it is revealed by X-ray diffraction that there is a crystal phase containing zirconium oxide, for instance, zircon ($SiO_2 \cdot ZrO_2$), other than the crystals of zirconium oxide, a calibration curve of the concentration of the crystals of this crystal phase is drawn with respect to the ratio between the crystal phase and zirconium oxide, and the content of tetragonal zirconium oxide may be measured therefrom.

In the present invention, the term "zirconia porcelain" means the zirconia porcelain mainly using yttrium oxide and cerium oxide as the stabilizer for zirconium oxide in which not more than 5% by weight of zirconium oxide may be substituted by hafnium oxide. Further, not more than about 10 mol % of yttrium oxide or cerium oxide may be substituted by other rare earth element compound such as yttrium oxide, samarium oxide, calcium oxide, magnesium oxide, titanium oxide or the like. The zirconia porcelain may include not higher than 10% of a sintering aid such as silica, silicate, alumina, clay, zircon or the like with respect to the whole porcelain.

Next, the method of producing the zirconia porcelain according to the invention will be explained below.

First, a mixture containing as stabilizer, yttrium compound of 1.5–5 mol %, preferably 2–3 mol % when calculated as yttrium oxide, and a cerium compound of 1–5.5 mol %, preferably 2–4 mol % when calculated as cerium oxide with the balance being mainly a zirconium compound including zirconium oxide is prepared. When these compounds are not oxides or when they are oxides in which a volatile compound is required to be removed, calcining occurs at 500°–1,200° C., and then fine crusing is carried out by a crushing mixer such as ball mill, vibration mill, attrition mill or the like, such that the average particle size when calculated in a form of sphere according to the air permeation method [FSSS (Fisher Sub-Sieve Sizer)] may not be larger than 1.5 μm, and shaped in a desired profile by the ordinary shaping method such as rubber press, extrusion, slip casting and the like. Then, the molding is held at the maximum temperature which falls within a range of 1,100° C.–1,700° C., preferably 1,200° C.–1,500° C., for 30 minutes to 20 hours. In order to suppress the particle size of the zirconium oxide crystals in the zirconia porcelain to not larger than 10 μm, it is necessary that the average particle size of the powder constituting the molding is not larger than 1.5 μm, the conent of the cerium oxide is not higher than 5.5 mol %, and the firing temperature is not higher than 1,700° C. That is, the particle size of the zirconium oxide in the zirconia porcelain increases with an increase in the average particle size of the particles constituting the molding, the content of the cerium oxide, and the firing temperature, and further the holding time at the highest temperature, as the case may be. The content of the cubic zirconium oxide particles increases with an increase in the content of yttrium oxide and the firing temperature. The content of the particles of monoclinic zirconium oxide on the surface of the tested member increases with a decrease in the content of cerium oxide, firing at a higher temperature, a slow temperature drop in the firing stage and the like.

Figure 7:
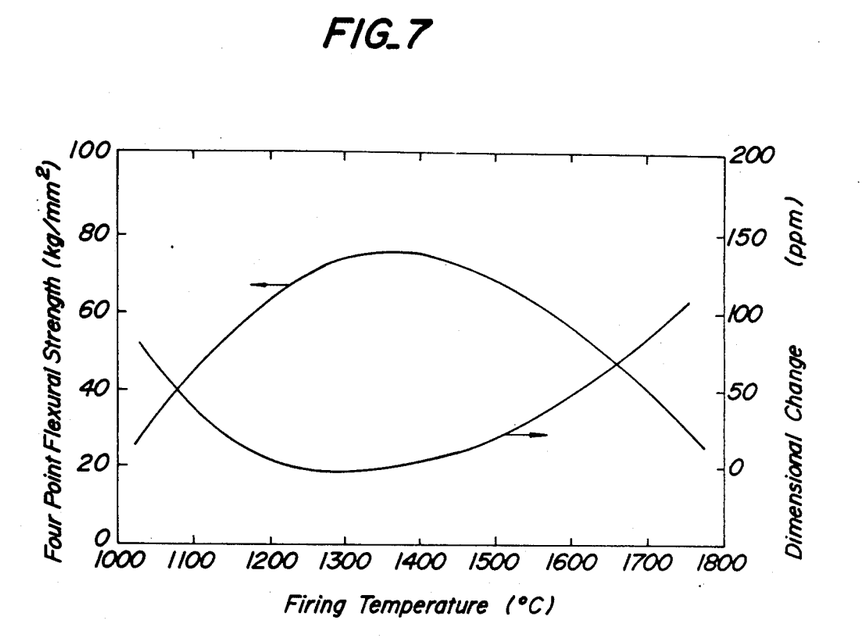
FIG. 7 is a diagram showing the relationship between the sintering temperature and the four point flexural strength or the dimensional change before and after the electric furnace durability test.

The reasons for the restrictions imposed upon the figures in the manufacturing method according to the present invention will be mentioned below. By suppressing the average particle size of the particles constituting the molding to 1.5 μm or less, as measured in the air permeation method, the average particle size of the crystals of zirconium oxide in the zirconia porcelain is prevented from being increased under the influence of the cerium oxide which promotes the grain growth, so that the reduction in the strength, yttrium oxide and cerium oxide are well diffused into the zirconium oxide, and the phase transformation from tetragonal zirconium oxide to monoclinic zirconium oxide is made difficult. If the average particle size exceeds 1.5 μm, a higher sintering temperature unfavorably becomes necessary, and the particle size of the crystals of zirconium oxide becomes larger, thereby lowering the strength after densification. The sintered body treated at the sintering temperature of less than 1,100° C. suffers from insufficient densification with a low strength, whereas when the sintering is carried out at a temperature higher than 1,700° C., the particles grow larger, cracks are developed due to stress concentration or the transformation from tetragonal zirconium oxide to monoclinic zirconium oxide, thereby lowering the strength. Due to the densification, large pores in the sintered body subjected to the sintering at a temperature range of 1,100° C. to 1,700° C. are reduced and the tetragonal phase in the sintered body is relatively stable, so that it has a high strength with an excellent thermal stability. Particularly, since the body is sintered at the sintering temperature range of 1,200°-1,500° C., it is fully densified, and its average particle size is not larger than 5 μm, and it has a high strength and a large thermal stability. In FIG. 7 the dependency of the flexural strength and the dimensional change rate before and after the durability test in the electric furnace upon the sintering temperature is shown.

The invention will be explained with more detail with reference to the following examples. They are given for illustration of the invention, but should not be interpreted to as limiting the scope of the invention.

Zirconium oxide, yttrium oxide, cerium oxide or a compound or compounds thereof were combined to be in the compounding recipe shown in Table 1, and mixed together in a ball mill. The mixture was calcined at 500°-1,200° C., wet crushed in the ball mill, and dried. The powder was press shaped, and sintered at 1,100° C.-1,700° C. for 1 hour-20 hours to obtain a zirconia porcelain according to the invention. The X ray diffraction integrated intensity, the flexural strength, the average crystal particle size, and the dimensional change in the electric furnace durability test were measured for comparison with respect to the porcelain thus obtained. In the X-ray diffraction integrated intensity measurement, a pellet which was ground by using a diamond grindstone and buffed to a surface roughness of not longer than $0.8^s$ prescribed in JIS B 0601 was used as a sample. The integrated intensity of a specified diffraction peak was determined in the conditions of a tube voltage of 50 KV, a tube current of 80 mA, a scanning speed of 0.25°/min. in a rotating anode (Cu target) type X-ray diffraction device, and the amounts of the respective crystal phases were quantitatively determined according to the polygonal measuring method. The flexural strength was measured according to a four point flexural test at an upper span of 10 mm, a lower span 30 mm, and a cross head speed of 0.5 mm/min by using a strength measuring sample of 3 mm×4 mm×40 mm according to the prescription of JIS R 1601 which was prepared from a rectangular plate by means of a diamond cutter and a diamond grindstone. The dimensional change in the electric furnace durability test was determined such that the flexural strength measuring sample was placed into an electric furnace, and a thermal treatment was performed by holding it in air at 250° C. for 5,000 hours, and then the length after the thermal treatment was measured by a micrometer, and finally the dimensional change was determined from the measured lengths before and after the thermal treatment. As shown in Table 1, it was confirmed that the zirconia porcelain according to the present invention has a strength of not less than 50 kg/mm², the dimensional change of less than 100 ppm in the electric furnace durability test, high strength and an excellent thermal stability without being deteriorated in a long time use. In Table 1, Examples 1-20 fall within the scope of the present invention, while Examples 21-35 are shown as Reference Examples.

TABLE 1

| No. | Yttrium oxide (mol %) | Cerium oxide (mol %) | Zirconium oxide (mol %) | Form of compound when added and mixed yttrium | Form of compound when added and mixed cerium | Average particle size in air permeation method (μm) | Sintering temperature (°C.) | Average particle size (μm) | Sintered body Tetragonal phase (%) | Sintered body Monoclinic phase (%) | Sintered body Cubic phase (%) | Flexural strength (kg/mm²) | Dimensional change before and after electric furnace durability test (ppm) | Remarks |
|---|---|---|---|---|---|---|---|---|---|---|---|---|---|---|
| 1 | 1.7 | 5.3 | 93.0 | N | N | 0.5 | 1,250 | 0.1 | 80 | 20 | 0 | 64 | 75 | N: nitrate |
| 2 | 2.0 | 1.0 | 97.0 | N | N | 0.5 | 1,300 | 0.1 | 90 | 10 | 0 | 92 | 25 |  |
| 3 | 2.0 | 2.0 | 96.0 | N | N | 0.5 | 1,350 | 0.2 | 100 | 0 | 0 | 105 | 0 |  |
| 4 | 2.0 | 3.0 | 95.0 | N | N | 0.5 | 1,350 | 0.2 | 100 | 0 | 0 | 104 | 0 | O: oxide |
| 5 | 2.0 | 5.0 | 93.0 | O | O | 0.4 | 1,550 | 2.5 | 80 | 15 | 5 | 55 | 50 |  |
| 6 | 3.0 | 1.0 | 96.0 | N | N | 0.4 | 1,450 | 0.3 | 85 | 10 | 5 | 87 | 25 |  |
| 7 | 3.0 | 2.0 | 95.0 | N | N | 0.4 | 1,450 | 0.3 | 90 | 5 | 5 | 90 | 0 |  |
| 8 | 3.0 | 3.0 | 94.0 | N | N | 0.4 | 1,400 | 0.2 | 95 | 0 | 5 | 85 | 0 |  |
| 9 | 3.0 | 3.0 | 94.0 | N | N | 1.0 | 1,600 | 7.1 | 55 | 5 | 40 | 62 | 25 |  |
| 10 | 3.0 | 4.0 | 93.0 | N | N | 0.4 | 1,400 | 0.2 | 95 | 0 | 5 | 72 | 0 |  |
| 11 | 3.0 | 4.0 | 93.0 | N | N | 0.4 | 1,550 | 3.1 | 60 | 5 | 35 | 58 | 25 |  |
| 12 | 3.0 | 4.0 | 93.0 | N | N | 0.9 | 1,620 | 8.4 | 50 | 5 | 45 | 53 | 50 |  |
| 13 | 3.0 | 4.0 | 93.0 | N | N | 0.9 | 1,660 | 11 | 45 | 5 | 50 | 53 | 75 |  |
| 14 | 3.0 | 4.0 | 93.0 | N | N | 1.3 | 1,680 | 13 | 35 | 10 | 55 | 51 | 75 |  |
| 15 | 3.0 | 5.0 | 92.0 | O | O | 1.3 | 1,450 | 0.5 | 85 | 0 | 15 | 59 | 0 |  |
| 16 | 4.0 | 1.0 | 95.0 | N | N | 0.4 | 1,550 | 2.9 | 50 | 5 | 45 | 54 | 50 |  |
| 17 | 4.0 | 5.0 | 91.0 | N | N | 0.4 | 1,500 | 1.1 | 70 | 0 | 30 | 52 | 25 |  |
| 18 | 5.0 | 2.0 | 93.0 | O | O | 1.4 | 1,500 | 2.5 | 40 | 0 | 60 | 55 | 25 |  |
| 19 | 5.0 | 4.0 | 91.0 | N | N | 1.3 | 1,650 | 12 | 30 | 0 | 70 | 51 | 25 |  |
| 20 | 5.0 | 5.3 | 89.7 | N | N | 1.0 | 1,500 | 1.5 | 45 | 0 | 55 | 56 | 0 |  |
| 21 | 1.0 | 1.0 | 98.0 | N | N | 0.5 | 1,250 | 0.1 | 10 | 90 | 0 | 0 | >10,000 |  |
| 22 | 1.0 | 3.0 | 96.0 | N | N | 0.5 | 1,250 | 0.1 | 20 | 80 | 0 | 0 | >10,000 |  |
| 23 | 1.0 | 6.0 | 93.0 | N | N | 1.0 | 1,250 | 0.1 | 25 | 75 | 0 | 0 | >10,000 |  |
| 24 | 1.0 | 0.0 | 98.0 | N | — | 1.0 | 1,300 | 2.5 | 70 | 30 | 0 | 75 | 450 |  |
| 25 | 2.0 | 0.8 | 97.2 | N | N | 1.5 | 1,580 | 13 | 40 | 60 | 0 | 19 | 400 |  |
| 26 | 2.5 | 5.7 | 91.8 | N | N | 1.0 | 1,720 | 15 | 25 | 70 | 5 | 9 | 5,000 |  |
| 27 | 3.0 | 0.0 | 97.0 | N | — | 1.0 | 1,400 | 0.2 | 90 | 0 | 10 | 90 | 250 |  |
| 28 | 3.0 | 0.8 | 96.2 | O | O | 1.7 | 1,680 | 10 | 20 | 25 | 55 | 12 | >10,000 |  |
| 29 | 3.0 | 5.0 | 92.0 | N | N | 1.5 | 1,720 | 15 | 35 | 15 | 50 | 34 | >10,000 |  |
| 30 | 3.0 | 10.0 | 87.0 | N | N | 0.9 | 1,400 | 0.7 | 85 | 0 | 15 | 37 | 25 |  |
| 31 | 3.0 | 17.0 | 80.0 | N | N | 0.9 | 1,400 | 3.0 | 55 | 0 | 45 | 31 | 25 |  |
| 32 | 5.0 | 6.0 | 89.0 | N | N | 1.5 | 1,400 | 3.2 | 40 | 0 | 60 | 33 | 25 |  |
| 33 | 5.2 | 0.8 | 94.0 | N | N | 1.4 | 1,350 | 1.2 | 70 | 0 | 30 | 35 | 0 |  |
| 34 | 5.2 | 2.8 | 92.0 | N | N | 1.4 | 1,350 | 1.8 | 65 | 0 | 35 | 28 | 0 |  |
| 35 | 6.0 | 5.0 | 89.0 | N | N | 1.3 | 1,600 | 12 | 40 | 10 | 50 | 25 | 0 |  |

Since a zirconia porcelain according to an present invention has the high strength and the excellent thermal stability by containing the specific amounts of yttrium oxide and cerium oxide, the porcelain is suitable for the parts which are subjected to mechanical and thermal stress such as thermal impact stress, repeated stress, repeated thermal stress and the like, for instance, engine parts such as engine cylinder liner, piston cap cylinder head, valve, valve guide, exhaust port, rocker arm chip sub-combustion chamber, tappet, cam, bearing and the like, an oxygen sensor, parts exposed to chemicals such as acid, or alkali and the like, for instance, rotor for an acidproof pump, seal member, cutting tool such as mess, scissors, knife, kitchen knife, or the like, in a wide range of industrial materials, and thus extremely useful industrially.

What is claimed is:

1. A zirconia porcelain ceramic body consisting essentially of 97.5–89.5 mol % of zirconia oxide, 1.5–5 mol % of yttrium oxide and 1–5.5 mol % of cerium oxide.

2. A zirconia porcelain according to claim 1, wherein said yttrium oxide is 2–3 mol % and said cerium oxide is 2–4 mol %.

3. A zirconia porcelain according to claim 1, wherein the zirconium oxide has an average particle size of not greater than 10 $\mu$m.

4. A zirconia porcelain according to claim 3, wherein the average particle size of the zirconium oxide is not greater than 2 $\mu$m.

5. A zirconia porcelain according to claim 1, wherein a total volume fraction of tetragonal zirconium oxide and cubic zirconium oxide is not less than 3 times the volume fraction of monoclinic zirconium oxide.

6. A zirconia porcelain according to claim 3, wherein a total volume fraction of tetragonal zirconium oxide and cubic zirconium oxide is not less than 3 times the volume fraction of monoclinic zirconium oxide.

7. A zirconia porcelain according to claim 4, wherein a total volume fraction of tetragonal zirconium oxide and cubic zirconium oxide is not less than 3 times the volume fraction of monoclinic zirconium oxide.

8. A zirconia porcelain according to claim 1, wherein a volume fraction of cubic zirconium oxide is less than the total volume fraction of tetragonal zirconium oxide and monoclinic zirconium oxide.

9. A zirconia porcelain according to claim 3, wherein a volume fraction of cubic zirconium oxide is less than the total volume fraction of tetragonal zirconium oxide and monoclinic zirconium oxide.

10. A zirconia porcelain according to claim 4, wherein a volume fraction of cubic zirconium oxide is less than the total volume fraction of tetragonal zirconium oxide and monoclinic zirconium oxide.

11. A zirconia porcelain according to claim 5, wherein a volume fraction of cubic zirconium oxide is less than the total volume fraction of tetragonal zirconium oxide and monoclinic zirconium oxide.

12. A zirconia porcelain according to claim 6, wherein a volume fraction of cubic zirconium oxide is less than the total volume fraction of tetragonal zirconium oxide and monoclinic zirconium oxide.

13. A zirconia porcelain according to claim 7, wherein a volume fraction of cubic zirconium oxide is less than the total volume fraction of tetragonal zirconium oxide and monoclinic zirconium oxide.

14. A method of producing a zirconia porcelain ceramic body, comprising the steps of preparing a mixed powder consisting essentially of 1.5–5 mol % of yttrium oxide, 1–5.5mol % of cerium oxide and 97.5–89.5 mol % zirconium oxide, said zirconium oxide having an average particle size of less than 1.5 $\mu$m when measured according to an air permeation method, shaping the mixed powder into a desired molding, and firing the molding at 1,100° C.–1,700° C.

15. A method according to claim 14, wherein the yttrium oxide is 2–3 mol %, and the cerium oxide is 2–4 mol %.

16. A method according to claim 14, wherein the molding is fied at a temperature of 1,200° C.–1,500° C.

17. A method according to claim 14, wherein a powder obtained by finely crushing oxides of zirconium, yttrium, and cerium or pyrolyzed products of these compounds are used as the mixed powder.

18. A method according to claim 16, wherein a powder obtained by finely crushing oxides of zirconium, yttrium, and cerium or pyrolyzed products of these compounds are used as the mixed powder.

* * * * *